UNITED STATES PATENT OFFICE 2,196,164

PROTECTIVE TREATMENT OF FRESH FRUITS AND VEGETABLES IN PREPARATION FOR MARKET

Miles L. Trowbridge and Charles D. Cothran, Pomona, Calif., assignors to Brogdex Company, Winter Haven, Fla., a corporation of Florida No Drawing. Application December 17, 1934, Serial No. 757,971

20 Claims. (Cl. 99—168)

This invention relates to protective treatment of fresh fruits and vegetables in preparation for market; and it relates more particularly to the preparation and employment of compositions useful in protectively treating fresh fruits and vegetables in order to reduce materially their normal rate of withering or shrinkage and otherwise to maintain them in sound, edible condition during commercial distribution and marketing.

The invention has practical utility in a very wide field, being applicable to protective treatment of virtually all fresh fruits and vegetables intended to be marketed in fresh condition. With respect to fresh fruits, the invention is particularly useful in the commercial packing, distribution and marketing of citrus fruits, including oranges, lemons, grapefruit, and tangerines; of deciduous fruits such as apples, plums and pears; and of miscellaneous fruits such as melons, bananas, pineapples and avocados. Among vegetables that may be effectively treated in accordance with the principles of the invention, potatoes and tomatoes may be mentioned by way of example.

In general, the process of the invention involves providing fruits or vegetables with a very thin, film-like coating of wax-like or other suitable protective material, the coating being of such extreme thinness as not to prevent or unduly interfere with the transpiration or breathing of the fruit or vegetable, yet being of a thickness sufficient to accomplish material reduction of the normal rate of withering or shrinkage caused by loss of moisture through the skin or rind; the protective material being applied to the fruit or vegetable in the form of an aqueous emulsion which, upon drying, leaves the desired protective coating adhering to the surface.

One of the difficulties heretofore encountered in protectively treating fresh fruit with aqueous emulsions of suitable coating material is the tendency of the fruit surface to dry only very slowly after application of the emulsion in any of the various ways available. In addition, there is often a tendency for the fruit to retain permanently an unduly moist or sticky feel, and this tendency has been found to persist in spite of much effort to eliminate it. Furthermore, the desired degree of reduction in withering and shrinkage (reduction to between about 25 and 40 per cent of the loss in weight through withering normally suffered by uncoated fruit is generally regarded as good practice) could not be attained or even approached heretofore without employing emulsions containing a relatively high percentage of coating material, on the order of 6 to 10 per cent or more, where the coating material is a waxy material like paraffin wax, for example. Aside from other objections, the application of such concentrated emulsions of coating material to fresh fruits and vegetables often gives them an unsightly surface appearance and therefore adversely affects their marketability, something necessarily to be avoided at all cost.

It is a general object of the invention to obviate the stated difficulties of prior art practice and, in addition, to improve the practice in protectively coating fresh fruit and vegetables by means of aqueous emulsions.

One of the principal specific objects of the invention is to provide a protective coating composition, in the form of an aqueous emulsion of suitable coating material, most advantageously a waxy or wax-like substance with which an oil may optionally be associated, which emulsion shall have, in addition to other necessary and desirable characteristics, the property of drying with reasonable rapidity after proper application to fruits or vegetables and leaving thereon a virtually invisible, thin, film-like protective coating which is adequate, however, materially to reduce withering or shrinkage, is substantially free of stickiness or tackiness, and in other respects is commercially satisfactory.

A further object of the invention is to provide a protective coating emulsion of the stated type, wherein the active emulsifying agent is a soap formed during the compounding of the emulsion (i. e. in situ) and under such conditions that the pH of the resultant emulsion, i. e. its reaction with respect to alkalinity or acidity, can be accurately predetermined and controlled within relatively narrow limits, thereby to ensure that the emulsion shall possess certain desirable physical characteristics, including homogeneity, permanence or stability, relatively high fluidity, and the property of readily releasing moisture when a thin layer of the emulsion is exposed to drying conditions.

Another object of the invention is to enable the production on fruits and vegetables of adequately protective film coatings by the application thereto of aqueous emulsions which nevertheless contain only a comparatively small percentage of the coating material employed.

Still another object of the invention is to provide such an emulsion which shall possess the capability of carrying, and shall actually carry, incorporated therein, a substantial percentage of a suitable mold-inhibiting agent without the permanence or stability of the emulsion being materially impaired, thus enabling impregnation of exposed rind tissues of fruits or vegetables by the mold-inhibiting agent as well as adequate coating of the fruit for retardation of withering or shrinkage both to be attained simultaneously in treating fruit or vegetables with the emulsion.

A further object of the invention is to provide suitable methods or processes of protectively treating fruit with emulsion compositions of the character set forth.

With the foregoing objects in view, as well as others which will become apparent hereinafter, the invention consists in novel processes of protectively treating fresh fruit, novel compositions of matter useful therein, and processes of preparing such compositions, all as will be more fully described in connection with certain typical practical embodiments of the invention and particularly pointed out in the appended claims.

In preparing an emulsion for protectively coating fresh fruits and vegetables, the use of a small quantity of a soap as an emulsifying agent is known to be desirable; and it is especially advantageous that this soap be formed "internally" in the emulsion (i. e. in situ) by reaction between the soap-forming reagents in intimate commixture with the protective material to be emulsified. Adding pre-formed soap to the mixture is very much less effective in producing homogeneous, stable and otherwise satisfactory emulsions for the purposes in view. Furthermore, soaps of the alkali-forming metals are found to be particularly desirable as emulsifying agents and to be markedly superior in important respects for this purpose to soaps of other bases such as amines, for example.

It has now been found, however, that the specific nature of the agents employed in producing the alkali-metal soaps for emulsifying the wax-like or other suitable protective coating material has an important effect upon the nature of the emulsion and of the protective film coating finally obtained on the fruit. By observing certain very definite precautions in preparing the coating emulsion, relatively rapid surface-drying of the treated fruit is promoted, and tackiness or stickiness of the finished coating may be largely or wholly eliminated. That is to say, in employing an alkaline hydroxide or alkaline salt as the basic or alkaline reagent for formation of the emulsifying soap constituent within the mixture to be emulsified, it is important that the other soap-forming reagent shall be a free fatty acid, or a mixture of free fatty acids, per se, rather than a fatty oil. A fatty oil consists largely of fatty acid glycerides accompanied by free fatty acid or acids in minor proportion, this proportion varying, however, with such factors as the source of the fatty oil, the refining treatment it has undergone, and length and conditions of storage. Because of this fact, different lots of a given fatty oil, vegetable or animal, often differ widely in content of free fatty acid, thus requiring different proportions of alkaline agent to effect neutralization and provide for a given desired degree of alkalinity in the emulsion to be prepared. Not only does this complicate preparation of the emulsion, but it results in emulsions which unavoidably vary in composition to an extent that may in some cases be undesirable in its effect upon the characteristics of the emulsion. These objections are entirely avoided by using a free fatty acid, instead of a fatty oil, in forming the emulsifying agent. Furthermore, the presence of glycerides, where a fatty oil is used, gives rise to formation of glycerol as a result of reaction with the alkaline hydroxide or salt used in forming the emulsifying soaps. Glycerol is a relatively very high-boiling substance and is therefore not eliminated by evaporation at the temperatures employed for the surface drying of fresh fruit or vegetables. Moreover, it is extremely hygroscopic and, if present in even only small quantities on the surface of fruit, attracts and holds moisture, thus tending to give the surface of the coated fruit a more or less permanently moist and sticky feel which is objectionable. Therefore, by excluding glycerides of fatty acids from the mixture to be emulsified, during the formation therein of the soap that is to serve as the emulsifying agent, the further advantage is gained that concomitant production of glycerol in the mixture and danger of objectionable effects therefrom are avoided.

Within the broad scope of the invention, a fairly wide variety of inorganic alkaline agents and fatty acids are available for production of the desired emulsifying agent (soap) within the mixture or emulsion. Among suitable basic or alkaline reagents may be mentioned as typical the hydroxides, carbonates and borates of sodium and potassium. The alkaline salts mentioned, being salts of relatively weak acids, are progressively hydrolyzed in water solution with production of the active hydroxides as required in the saponifying reaction. Trisodium phosphate is another alkaline salt available for use. But, for reasons to be explained hereinafter, an alkali metal borate, e. g. ordinary borax ($Na_2B_4O_7.10H_2O$), is an especially desirable alkaline agent to employ in this connection, being so distinctly superior to other alkaline agents for the purposes of the invention as to be outstanding. Suitable fatty acids include oleic, stearic, palmitic and linoleic, for example, all of which are readily available commercially. Oleic and stearic acids are found in practice to be particularly suitable and effective. For most purposes, highly refined oleic acid is to be particularly recommended in practice. It is feasible to employ any other free fatty acid from which a soap satisfactory as an emulsifying agent may be made. In any case, a well refined grade of fatty acid is most advantageous to employ. Reaction between any such fatty acid and a hydroxide or alkaline-reacting salt of an alkali metal results in formation of the corresponding sodium or potassium soap, with elimination of water. No glycerol is formed in this reaction.

As regards the available normally solid protective coating materials suitable for use in practicing the invention, these are numerous and varied. In general, wax-like substances, whether true waxes in the chemical sense or not, are most suitable; but the invention is not limited to the employment of any particular protective material or class of protective material, provided it is of such character that it can be emulsified in a relatively large amount of water with the aid of a soap emulsifying agent of the character described, and further provided that, when applied as herein directed, it will form on the surface of a fresh fruit or vegetable an adherent, thin, film-like coating effective to materially reduce the normal rate of withering or shrinkage, while at the same time not so completely sealing the rind or skin as unduly to interfere with the breathing or transpiration essential to the well-being of the fresh fruit or vegetable as a living organism.

Paraffin wax of good commercial grade is very satisfactory. Other mineral waxes, such as ozokerite and montan wax, and waxes of vegetable origin, such as carnauba, beeswax, candelilla, etc., are also suitable waxy or wax-like materials for the purposes of the invention. Two or more such materials may sometimes be advantageously employed in mixture. This is particularly so where for any reason it is desired to make use of a wax such as carnauba, which has certain valuable characteristics but is rather too hard and brittle to form by itself a satisfactory protective coating for fruit. By blending such a wax with a larger proportion of a softer waxy material like paraffin and preparing an aqueous emulsion of the mixture in accordance with the principles of the invention, protective coatings on fruits and vegetables are obtainable that possess special advantages for some purposes.

Slight excess or free alkalinity of the coating emulsions used, and accurate predetermination and control of that alkalinity within rather well defined and most desirably rather narrow limits, are important features of the invention. Slight free alkalinity favors maximum homogeneity and stability of the emulsion. Moreover, it renders the emulsion relatively quick-drying when applied to fresh fruits or vegetables. This is due at least in part to the thin and freely fluid character of such an alkaline emulsion, whereby any excess drains quickly and cleanly from the fruit or vegetable being coated, leaving a thin and uniformly distributed layer over the entire rind or skin, from which layer the moisture content is freely and rapidly released and evaporated when the coated article is subjected to surface drying conditions. But too much free alkali in the emulsion adversely affects its physical characteristics, often causing it to "break". In the practice of the invention, it is found that most satisfactory results in coating fruits and vegetables are attained with emulsions having pH values ranging approximately from 7.7 to 9.3, a pH of between 7.9 and 8.2 being optimum. The foregoing ranges of pH values are indicative of good practice, but it is not to be inferred that use of emulsions having somewhat higher or lower pH values is excluded from the practice of the invention in some of its broader aspects. However, emulsions having pH values lower than 7.5 or higher than 11.5 are generally so much less desirable that they are not ordinarily to be recommended for commercial work.

The importance of thus controlling the pH of the coating emulsion within a definite range of alkalinity emphasizes the desirability of using a free fatty acid per se, rather than a fatty oil in preparing the emulsion, because of the before-mentioned variability of fatty oils in respect to fatty acid content. The direct preparation of an emulsion of a predetermined desired alkalinity, using a fatty oil with a water soluble alkaline agent to form the emulsifying soap, is therefore difficult and in some cases practically impossible. Moreover, if it be attempted to adjust or correct the pH of such an emulsion to a desired value after its preparation, by adding the necessary quantity of acid or alkali thereto, not only is the procedure further complicated, but the resultant formation of salts may have a disturbing effect upon the emulsion. These difficulties are avoided in the practice of the present invention where a free fatty acid per se is used. Furthermore, in order to simplify preparation of the emulsion and ensure ready attainment and maintenance of its pH value at the optimum point or within the desired limits under the more or less variable operating conditions ordinarily characterizing commercial packing house practice, it is important to employ in effecting the saponification a moderate excess of a water-soluble inorganic alkaline agent of such character as to have strong buffering action in the emulsion. To this end, and in order to obtain an emulsion having the other desirable characteristics herein emphasized, it is essential to employ an alkali metal borate, more particularly of the type of sodium tetraborate and most desirably in the form of ordinary borax, where the pH value is to be maintained within the range 7.7-9.3. This does not exclude altogether the use of relatively stronger alkalies; but for operation within the pH range stated, they should be so employed in association with a compound or compounds of the boric acid radical as to provide a buffer system comparable with that provided by borax. Such a system (alkaline borate) is found to be specific and unique in its favorable influence on the character and properties of an emulsion for fruit-coating purposes and is therefore particularly recommended for use in practicing the invention. Borax itself is especially well adapted for the purposes in view and is therefore ordinarily used in commercial work.

Another very important advantage of employing borax or an equivalent alkaline borate in emulsions of the type herein contemplated is that it can be used in large excess without detrimental effect upon the stability or other desirable properties of the emulsions. This capability of borax seems to be unique; it is not shared in comparable degree by other inorganic alkaline agents such as alkali metal hydroxides and carbonates. Moreover, it is extremely advantageous for the purposes of the invention because it enables incorporating in the fruit-coating emulsion a most effective decay-inhibiting agent, borax, without adversely affecting the character of the emulsion. Generally speaking, at least about 2 per cent excess borax should be present in the aqueous emulsion to attain satisfactory action in inhibiting blue and green molds and other forms of decay such as stem-end rot; and higher concentrations, such as 5 per cent or more, are more effective. Such concentrations of borax, and even up to its maximum limit of solubility in the emulsion, may be employed without destroying the desirable properties of the emulsion.

Another important feature of the invention consists in the optional but desirable employment, in a coating emulsion of the type herein described, of a suitable non-volatile oil in such manner that the reduction in normal shrinkage or withering rate of the fruit to be accomplished by application of the emulsion is determined and adjusted or controlled within reasonable limits by the proportion of such oil with respect to the waxy or other solid protective constituent of the emulsion, rather than by the quantity of protective material applied to the fruit. In the broader aspects of the invention, the specific character of the oil is not material provided it is non-volatile and therefore remains permanently associated with the waxy (e. g.) constituent of the finished protective coating on the fruit, is non-injurious to the fruit or its edibility, and is not objectionable on other grounds such as color, taste and odor. However, an oil most desirable for use in the practice of the invention is a highly refined mineral oil of the general type known as white or medicinal mineral oil which, while permissibly varying considerably in detailed specification, has a flash point well above the boiling point of water, and is substantially without color, taste or odor. With the aid of a soapy emulsifying agent, such an oil emulsifies well in water, in company with paraffin or other waxy material, and the oil somewhat enhances the stability of the emulsion.

The added oil acts to dilute and soften the waxy material, giving the finished coating a better consistency and improving its adherence to the fruit or vegetable. Moreover, it has been found that the shrinkage-retarding effect of the coating can be adjusted and controlled by varying the ratio of oil to wax, an increase in the proportion of oil conferring greater sealing and shrinkage-retarding power upon the coating. Within limits, the effect thus produced by the oil addition is disproportionately large, thus making it possible to produce on fruit or vegetables a satisfactorily effective shrinkage-retarding film that would be ineffectively thin if waxy material alone were present. Where it is not important that the coating present a permanently glossy surface or shine, the use of a suitable oil in the emulsion therefore has certain advantages. But a coating in which the weight ratio of oil to waxy material is substantially greater than 1:1 is apt to exhibit objectionable characteristics; hence use of such larger proportions of oil is to be avoided. Ordinarily, best results are obtained using considerably smaller proportions of oil. In practice, therefore, ratios of oil to paraffin much lower than 1:1 are decidedly preferable, particularly since the shrinkage-retarding effect of the finished coating can be more accurately adjusted and controlled by using such lower ratios. A particularly desirable range for the oil-wax ratio is from 1:5 to 1:3. A ratio lower than 1:10 is seldom desirable to employ where any oil is used in preparing the emulsion. Adjustment and control of the shrinkage-retarding effect by the use of varying minor proportions of a non-volatile oil relative to the waxy component is believed to be broadly novel in the art, irrespective of the specific emulsifying agent employed. Where the emulsifying soap used is relatively hard, as in the case of a stearic acid soap, a larger proportion of oil is desirable than where an oleic acid soap, for example, is used.

The use of a fatty (vegetable or animal) oil to replace in whole or in part a mineral oil such as that above described is generally not advisable; and, where there is opportunity for reaction to occur in the emulsion between the fatty oil and borax, the use of such an oil is precluded because of glycerol formation, the objectionable effect of which upon the character of the finished coating is especially pronounced where a non-volatile oil is a component of the emulsion. Moreover, fatty oils have a much greater tendency to cause paraffin (e. g.) to crystallize than does a mineral oil of the type herein recommended for use. Hence use of the latter tends to produce a final coating in which the waxy material is in an amorphous and more homogeneous condition, which is advantageous in extremely thin and film-like shrinkage-retarding coatings for fruit and vegetables.

In its most advantageous practical embodiments, the invention is particularly characterized by the use of emulsions containing only a relatively small proportion of waxy material, i. e. from about 1 up to not substantially exceeding 5 per cent. In exceptional cases, as much as 10 per cent of waxy material may be present, but such large percentages are not usually desirable, and where employed, the supplemental use of an oil is always advisable. In any case, presence of a non-volatile oil lowers the melting point of the waxy component (about 125° F. for paraffin), tends to maintain it in the form of fluid rather than congealed particles both during application of the emulsion, which is best carried out at temperatures approximating 110° or 115° F., and during subsequent drying down of the emulsion on the coated articles, which usually occurs at ordinary room temperature or sometimes slightly above.

It is important that, however constituted specifically, the emulsion shall have the property of drying down to a waxy film on the coated articles, as distinguished from merely congealing to a mass resembling cold cream; and by proceeding in the manner herein disclosed, this desired objective is attained. A few typical examples of emulsions constituted in accordance with the principles of the invention and suitable in practicing the same will now be given by way of further illustration. In all these examples, the indicated percentages are by weight. It is to be understood that these formulae are merely indicative of good practice, and that the invention is in no sense restricted to the use of emulsions thus specifically constituted.

| Formula | A | B | C | D | E | F | G |
|---|---|---|---|---|---|---|---|
| | Per- cent | Per- cent | Per- cent | Per- cent | Per- cent | Per- cent | Per- cent |
| Waxy material (e. g. paraffin) | 3 | 5 | 5 | 1 | 2½ | 7½ | 8 |
| Mineral oil (e. g. white oil) | 1 | 1 | 1 | ½ | 1 | 3 | 1 |
| Oleic acid | 1 | 1 | | ¼ | 1 | | 1 |
| Stearic acid | | | 1 | | | 3 | |
| Borax | 1 | 1 | 1 | ¼ | 1 | 3 | 1 |
| Water | (Sufficient to make 100%) | | | | | | |

In any of the formulae given, the proportion of borax used may be increased, for example by 5 per cent, to give the desired excess for mold-inhibiting action. The mineral oil may be omitted from any of these emulsions in cases where it may be desired to coat the fruit or vegetable with straight paraffin or other waxy material. The trade demands high surface gloss or shine in the case of some fruits but not in others; and, since the presence of non-volatile oil in the finished coating commonly tends to lessen the degree of gloss or shine somewhat, omitting the mineral oil or reducing the proportion thereof used below even the small percentages given in the above examples is sometimes advisable. The oil may be omitted in treating such fruits as avocados, apples, pineapples and oranges, for example, where trade conditions require.

In the above typical emulsion formulae, equal parts by weight of fatty acid and borax are specified for use in forming the soap serving as emulsifying agent. Since borax neutralizes approximately one and one-half times its weight of fatty acid, the specified proportion of borax ensures the presence of some excess in the emulsion, and consequent slight alkalinity thereof. Formula A, for example, shows a pH of about 8.0 or 8.1 as determined by potentiometer, using a hydrogen electrode, which is an optimum pH value for the purposes of the invention.

While in the above emulsion formulae the amount of soap used is that resulting from saponification of from 0.75 to 3 per cent fatty acid, larger proportions may be employed under some circumstances up to say, the equivalent of as much as 10 per cent of fatty acid. Such larger percentages of soap are ordinarily not necessary, however, and may even be undesirable because of their tendency to increase the emulsion viscosity unduly. On the other hand, the amount of soap formed in preparing the emulsion should be equivalent to at least 0.5 per cent of free fatty acid as a rule in order to get effective emulsification.

In preparing an emulsion of the type described, the proper amounts of paraffin or other waxy material, fatty acid and mineral oil are heated together to about 160°–180° F. to form a homogeneous liquid mixture. The necessary amount of water is separately heated to about 160° F. and the required amount of borax is dissolved therein. Into this hot borax solution contained in an agitating tank is run the hot liquid mixture or solution of wax, mineral oil and fatty acid, with constant agitation which is continued for some time, say, for five to fifteen minutes after all said mixture has been added to the borax solution. The borax solution may be run into the wax mixture, if desired, instead of running the wax mixture into the borax solution as above described; but the procedure first described, which is believed novel, has been found to produce a better emulsion for some reason, and is accordingly regarded as preferable. Most desirably, the resultant emulsion is then pumped through a colloid mill in order still further to perfect it. It is then ready for application to fresh fruit or vegetables in any desired manner as by dipping, spraying or brushing. The emulsion being freely fluid, especially when oleic acid is used in forming the emulsifying soap, any excess drains quickly from articles to which it is applied; and the residual thin layer dries down to a tenaciously adherent waxy film coating adequate to retard withering of the fruit or vegetable satisfactorily but still permitting transpiration to occur sufficiently. For best results the emulsion should be applied moderately warm, for example between 105° and 125° F., about 110° to 115° F. being typical good practice; but application at lower temperatures is permissible within the scope of the invention, although less advantageous. It is an important feature of the invention that coating compositions of the type herein disclosed may advantageously be applied to fresh fruit or vegetables whose surface is already wet, as where the fruit undergoes a previous washing or other treatment with water or an aqueous medium and is not surface dried before application of the shrinkage-retarding composition. The properties of the described emulsions are such that they are compatible with wet fruit or vegetable surfaces and peculiarly effective to contact the same intimately at all points.

Another important characteristic of those embodiments of the described emulsion that contain a non-volatile oil in association with waxy material is that the waxy material and oil, taken together, constitute not more than about 15 per cent of the complete emulsion, and most desirably only about 3 to 6 per cent thereof, the practical minimum being about 2 per cent.

Unless otherwise indicated, the word "fruit" as employed in the appended claims is to be understood in a generic sense to include broadly both fruit and vegetables, and the claims are to be construed accordingly.

What is claimed is:

1. As a new composition of matter, an aqueous emulsion suitable for protectively coating fresh fruit in preparation for market which comprises suitable normally solid coating material compatible with the surface of fresh fruit and non-injurious thereto, emulsified in an aqueous medium with the aid of a soap formed by reaction in situ between a free fatty acid and an excess of an alkaline reacting water-soluble compound of an alkali metal, said emulsion having a pH value of between 7.5 and 11.5 and being capable, after application to fresh fruit, of drying down to a substantially continuous, adherent protective film coating that is substantially dry and non-tacky.

2. As a new composition of matter, an aqueous emulsion as defined in claim 1, wherein the coating material is waxy in character.

3. As a new composition of matter, an aqueous emulsion as defined in claim 1, wherein said solid coating material consists wholly or principally of paraffin wax.

4. As a new composition of matter, an aqueous emulsion as defined in claim 1, wherein said solid coating material consists wholly or principally of paraffin wax, and constitutes between about 1 and 5 per cent of the emulsion.

5. As a new composition of matter, an aqueous emulsion as defined in claim 1, wherein the coating material is waxy in character, said emulsion having a pH value of from about 7.7 to 9.3, the emulsifying soap being the product of reaction between a free fatty acid and an excess of borax.

6. As a new composition of matter, an aqueous emulsion as defined in claim 1, wherein the coating material is waxy in character, further characterized by the fact that said emulsion contains borax in amount ranging from about 2 per cent to its upper limit of solubility therein.

7. As a new composition of matter, an aqueous emulsion suitable for protectively coating fresh fruit in preparation for market which comprises waxy material and non-volatile oil emulsified therewith in an aqueous medium by means of an associated soapy emulsifying agent, said waxy material and oil taken together constituting from about 2 to 15 per cent of the emulsion, and the ratio of oil to wax being within the approximate limits 1:10 and 1:1, said emulsion having a pH value of from about 7.7 to 9.3.

8. As a new composition of matter, an aqueous emulsion suitable for protectively coating fresh fruit in preparation for market which comprises waxy material and non-volatile oil emulsified therewith in an aqueous medium by means of an associated soapy emulsifying agent, said waxy material and oil taken together constituting from about 2 to 15 per cent of the emulsion, and the ratio of oil to wax being within the approximate limits 1:10 and 1:1, said emulsion having a pH value between the approximate limits 7.5 and 11.5.

9. As a new composition of matter, an aqueous emulsion suitable for protectively coating fresh fruit in preparation for market which comprises waxy material and non-volatile oil emulsified therewith in an aqueous medium by means of an associated soapy emulsifying agent formed by reaction in situ between a fatty acid and an excess of a water-soluble alkaline-reacting compound of an alkali metal in the absence of glycerides, said waxy material and oil taken together constituting from about 2 to 15 per cent of the emulsion, and the ratio of oil to wax being within the approximate limits 1:10 and 1:1, said emulsion having a pH value of from about 7.5 to 11.5.

10. As a new composition of matter, an aqueous emulsion suitable for protectively coating fresh fruit in preparation for market which comprises waxy material and non-volatile oil emulsified therewith in an aqueous medium by means of an associated soapy emulsifying agent formed by reaction in situ between a free fatty acid and an excess of borax, said waxy material and oil taken together constituting from about 2 to 15 per cent of the emulsion, and the ratio of oil to wax being within the approximate limits 1:10 and 1:1, said emulsion having a pH value of from about 7.7 to 9.3.

11. As a new composition of matter, an aqueous emulsion suitable for protectively coating fresh fruit in preparation for market which comprises waxy material and non-volatile oil emulsified therewith in an aqueous medium by means of an associated soapy emulsifying agent, said waxy material and oil taken together constituting from about 2 to 15 per cent of the emulsion, and the ratio of oil to wax being within the approximate limits 1:10 and 1:1, said emulsion containing an emulsifying agent comprising a soap formed by reaction in situ between a free fatty acid and borax, together with additional borax in amount ranging from about 2 per cent to its upper limit of solubility therein.

12. As a new composition of matter, an aqueous emulsion suitable for coating fresh fruit in preparation for market which comprises, substantially, from about 1 to 5 parts paraffin and about one-fifth to one-third as much white mineral oil, emulsified, with the aid of oleic acid and borax, in a sufficient amount of water to make a total of 100 parts, said emulsion having a pH value of from about 7.7 to 9.3.

13. As a new composition of matter, an aqueous emulsion suitable for coating fresh fruit in preparation for market which comprises, substantially, 2 to 3 parts paraffin and 1 part white mineral oil, emulsified in water with the aid of 1 part oleic acid and 1 part borax, the amount of water being sufficient to make a total of 100 parts.

14. The process of protectively treating fresh fruit in preparation for market which comprises applying to fresh fruit an emulsion of the character defined in claim 1, in such manner as to cover thinly the entire fruit surface therewith, and exposing the fruit to surface drying conditions.

15. The process of protectively treating fresh fruit in preparation for market which comprises applying to fresh fruit an emulsion of the character defined in claim 1 in such manner as to cover thinly the entire fruit surface therewith, and exposing the fruit to surface drying conditions, further characterized by the fact that the surface of the fruit is wet, as from a preceding washing operation (e. g.), when said emulsion is applied thereto.

16. The process of protectively treating fresh fruit in preparation for market which comprises applying to fresh fruit an emulsion of the character defined in claim 1 in such manner as to cover thinly the entire fruit surface therewith, and exposing the fruit to surface drying conditions, further characterized by the fact that the coating material is waxy in character and that the emulsion has a pH value of from about 7.7 to 9.3, the emulsifying soap being the product of reaction between a free fatty acid and an excess of borax.

17. The process of protectively treating fresh fruit in preparation for market which comprises applying to fresh fruit an emulsion of the character defined in claim 1 in such manner as to cover thinly the entire fruit surface therewith, and exposing the fruit to surface drying conditions, further characterized by the fact that the coating material is waxy in character, the emulsifying soap being the product of reaction between a free fatty acid and borax, and the emulsion containing additional borax in amount ranging from about 2 per cent to its upper limit of solubility therein.

18. The process of protectively treating fresh fruit in preparation for market which comprises applying to fresh fruit an emulsion comprising waxy material and non-volatile oil emulsified therewith in an aqueous medium by means of an associated soapy emulsifying agent, said waxy material and oil taken together constituting from about 2 to 15 per cent of the emulsion, and the ratio of oil to wax being within the approximate limits 1:10 and 1:1, in such manner as to cover thinly the entire fruit surface therewith, and exposing the fruit to surface drying conditions, further characterized by the fact that said emulsifying agent is formed by reaction in situ between a free fatty acid and an excess of borax, said emulsion having a pH value of from about 7.7 to 9.3.

19. The process of protectively treating fresh fruit in preparation for market which comprises applying to fresh fruit an emulsion of the character defined in claim 1 in such manner as to cover thinly the entire fruit surface therewith, and exposing the fruit to surface drying conditions, further characterized by the fact that the coating material is waxy in character, the emulsifying soap being the product of reaction between a free fatty acid and borax, and the emulsion containing additional borax in amount ranging from about 2 per cent to its upper limit of solubility therein, said emulsion being applied to the surface of the fruit while it is wet from a preceding operation such as washing.

20. The process of protectively treating fresh fruit in preparation for market which comprises applying to fresh fruit an emulsion comprising waxy material and non-volatile oil emulsified therewith in an aqueous medium by means of an associated soapy emulsifying agent, said waxy material and oil taken together constituting from about 2 to 15 per cent of the emulsion, and the ratio of oil to wax being within the approximate limits 1:10 and 1:1, in such manner as to cover thinly the entire fruit surface therewith, and exposing the fruit to surface drying conditions, further characterized by the fact that said emulsifying agent is formed by reaction in situ between a free fatty acid and an excess of borax, said emulsion having a pH value of from about 7.7 to 9.3, said emulsion being applied to the surface of the fruit while it is wet from a preceding operation such as washing.

MILES L. TROWBRIDGE.
CHARLES D. COTHRAN.